United States Patent
Lu et al.

(10) Patent No.: US 11,997,116 B2
(45) Date of Patent: May 28, 2024

(54) DETECTION DEVICE AND DETECTION METHOD FOR MALICIOUS HTTP REQUEST

(71) Applicant: Industrial Technology Research Institute, Hsinchu (TW)

(72) Inventors: Pei-Hsuan Lu, Hsinchu (TW); Pang-Chieh Wang, Taipei (TW)

(73) Assignee: Industrial Technology Research Institute, Hsinchu (TW)

(*) Notice: Subject to any disclaimer, the term of this patent is extended or adjusted under 35 U.S.C. 154(b) by 343 days.

(21) Appl. No.: 17/523,945

(22) Filed: Nov. 11, 2021

(65) Prior Publication Data
US 2023/0116486 A1    Apr. 13, 2023

(30) Foreign Application Priority Data
Oct. 13, 2021    (TW) .................................. 110138049

(51) Int. Cl.
*H04L 9/40*    (2022.01)
*G06N 3/044*    (2023.01)
*G06N 3/045*    (2023.01)

(52) U.S. Cl.
CPC ......... *H04L 63/1416* (2013.01); *G06N 3/044* (2023.01); *G06N 3/045* (2023.01)

(58) Field of Classification Search
CPC .................................................. H04L 63/1416
See application file for complete search history.

(56) References Cited

U.S. PATENT DOCUMENTS

| | | | |
|---|---|---|---|
| 7,409,708 B2 | 8/2008 | Goodman et al. | |
| 8,521,667 B2 | 8/2013 | Zhu et al. | |
| 8,949,978 B1* | 2/2015 | Lin ...................... | H04L 63/123 726/25 |
| 9,178,901 B2 | 11/2015 | Xue et al. | |

(Continued)

FOREIGN PATENT DOCUMENTS

| | | |
|---|---|---|
| CN | 107346388 | 11/2017 |
| CN | 109347889 | 2/2019 |

(Continued)

OTHER PUBLICATIONS

Knime.com, "Text Encoding: A Review", https://www.knime.com/blog/text-encoding-review, Mar. 18, 2019 (Year: 2019).*

(Continued)

*Primary Examiner* — Jerry B Dennison
(74) *Attorney, Agent, or Firm* — JCIPRNET

(57) ABSTRACT

A detection device and a detection method for a malicious HTTP request are provided. The detection method includes: receiving a HTTP request and capturing a parameter from the HTTP request; filtering the HTTP request in response to the parameter not matching a whitelist; encoding each character of the HTTP request to generate an encoded string in response to the HTTP request not being filtered; generating an estimated HTTP request according to the encoded string by using an autoencoder; and determining that the HTTP request is a malicious HTTP request in response to a similarity between the HTTP request and the estimated HTTP request being less than a similarity threshold, and outputting a determined result.

14 Claims, 4 Drawing Sheets

(56) References Cited

U.S. PATENT DOCUMENTS

| | | | |
|---|---|---|---|
| 9,426,174 | B2 | 8/2016 | Campbell |
| 10,135,863 | B2 | 11/2018 | Dennison et al. |
| 10,693,901 | B1* | 6/2020 | Chan .................. H04L 67/02 |
| 10,728,277 | B2 | 7/2020 | Dennison et al. |
| 10,785,241 | B2 | 9/2020 | Li |
| 11,012,414 | B2 | 5/2021 | Moore et al. |
| 11,249,965 | B2* | 2/2022 | Meron ............. G06F 16/90344 |
| 2017/0126718 | A1 | 5/2017 | Baradaran et al. |
| 2020/0012784 | A1* | 1/2020 | Orihara ............ H04L 63/1425 |
| 2020/0065616 | A1 | 2/2020 | Xu et al. |
| 2020/0097587 | A1* | 3/2020 | Klein ................ G06F 16/2462 |
| 2020/0210745 | A1* | 7/2020 | Luo ..................... G06V 30/413 |
| 2020/0226475 | A1* | 7/2020 | Ma ......................... G06N 3/084 |
| 2020/0296134 | A1* | 9/2020 | Sreedhar ................ H04L 63/20 |
| 2020/0311265 | A1 | 10/2020 | Jones et al. |
| 2020/0314066 | A1* | 10/2020 | Cruz Farmer ...... H04L 63/0245 |
| 2020/0314135 | A1* | 10/2020 | Kang .................. H04L 63/1433 |
| 2021/0042442 | A1* | 2/2021 | Al-Kabra ................ H04L 67/10 |
| 2021/0185066 | A1* | 6/2021 | Shah ....................... G06N 3/08 |
| 2021/0306353 | A1* | 9/2021 | Diener .................. G06F 21/552 |
| 2021/0326438 | A1* | 10/2021 | Dichiu .................... G06F 21/56 |
| 2021/0377300 | A1* | 12/2021 | Devane ............. H04L 63/1416 |
| 2022/0038424 | A1* | 2/2022 | Liu ........................ H04L 67/02 |
| 2022/0172037 | A1* | 6/2022 | Kang ....................... G06N 3/08 |
| 2022/0400134 | A1* | 12/2022 | Chen Kaidi ........... G06V 30/19 |
| 2023/0116486 | A1* | 4/2023 | Lu .......................... G06N 3/045 |
| | | | 726/23 |
| 2023/0353585 | A1* | 11/2023 | Wan .................... H04L 63/1425 |

FOREIGN PATENT DOCUMENTS

| | | |
|---|---|---|
| CN | 110768946 | 2/2020 |
| CN | 111181932 | 5/2020 |
| CN | 111327608 | 6/2020 |
| CN | 111740962 | 10/2020 |
| CN | 108449342 | 11/2020 |
| CN | 112367338 | 2/2021 |
| CN | 113449302 | 9/2021 |
| TW | I684113 | 2/2020 |
| WO | 2019085275 | 5/2019 |

OTHER PUBLICATIONS

Kyunghyun Cho, et al., "Learning Phrase Representations using RNN Encoder-Decoder for Statistical Machine Translation", arXiv:1406.1078 v3 [cs.CL], Sep. 3, 2014, pp. 1-15.

Ilya Sutskever, et al. "Sequence to Sequence Learning with Neural Networks", Oct. 24, 2018, arXiv: 1409.3215 v3 [cs.CL], Dec. 14, 2014, pp. 1-9.

Ali Moradi Vartouni, et al. "Leveraging deep neural networks for anomaly-based web application firewall", Oct. 24, 2018, IET Information Security, pp. 1-12.

"Office Action of Taiwan Counterpart Application", issued on Apr. 8, 2022, p. 1-p. 5.

* cited by examiner

DETECTION DEVICE AND DETECTION METHOD FOR MALICIOUS HTTP REQUEST

CROSS-REFERENCE TO RELATED APPLICATION

This application claims the priority benefit of Taiwan application serial no. 110138049, filed on Oct. 13, 2021. The entirety of the above-mentioned patent application is hereby incorporated by reference herein and made a part of this specification.

TECHNICAL FIELD

This disclosure relates to a detection device and a detection method for hypertext transfer protocol (HTTP) requests.

BACKGROUND

Malicious HTTP requests are a common attack method. Hackers can attack a server by injecting a malicious code into normal HTTP requests, thereby stealing data from the server. With the development of machine learning technology, an increasing number of people have proposed methods of using machine learning models to detect malicious HTTP requests. However, such method has many shortcomings. Taking the supervised machine learning model as an example, the training of the supervised machine learning model requires acquisition of a large amount of labelled data including normal HTTP requests and malicious HTTP requests, but it is very difficult to obtain the labelled data of malicious HTTP requests.

In addition, the feature data used as the training data for the supervised machine learning model needs to be selected by professionals. Therefore, it is difficult for users without background knowledge to implement the training. On the other hand, although the training of the unsupervised machine learning model does not require a large amount of labelled data, the unsupervised machine learning model has a higher false alarm ratio (FAR).

SUMMARY

The disclosure provides a detection device and a detection method for malicious hypertext transfer protocol (HTTP) requests, which can automatically detect malicious HTTP requests.

A device for detecting malicious HTTP requests according to an embodiment of the disclosure includes a processor, a storage medium, and a transceiver. The storage medium stores multiple modules. The processor is coupled to the storage medium and the transceiver, and accesses and executes multiple modules. The multiple modules include a data collection module, a filtering module, an encoding module, an autoencoder, and a detection module. The data collection module receives the HTTP request through the transceiver, and captures parameters from the HTTP request. The filtering module filters the HTTP request in response to the parameter not matching the whitelist. The encoding module encodes each character of the HTTP request to generate an encoded string in response to the HTTP request not being filtered. The autoencoder generates an estimated HTTP request based on the encoded string. The detection module determines that the HTTP request is a malicious HTTP request in response to a similarity between the HTTP request and the estimated HTTP request is less than a similarity threshold, and outputs a determined result through the transceiver.

A method for detecting a malicious HTTP request according to an embodiment of the present disclosure includes: receiving an HTTP request, and capturing parameters from the HTTP request; filtering the HTTP request in response to the parameter not matching the whitelist; encoding each character of the HTTP request to generate an encoded string in response to the HTTP request not being filtered; generating an estimated HTTP request according to the encoded string by using an autoencoder; and determining that the HTTP request is a malicious HTTP request in response to a similarity between the HTTP request and the estimated HTTP request is less than a similarity threshold, and outputting a determined result.

Based on the above, the detection device of the disclosure can detect malicious HTTP requests through a whitelist and an autoencoder. The detection device can detect the malicious HTTP request more accurately without collecting the labelled data of the malicious HTTP request, consuming less computing resources, and costing less time.

DETAILED DESCRIPTION OF DISCLOSED EMBODIMENTS

Figure 1:
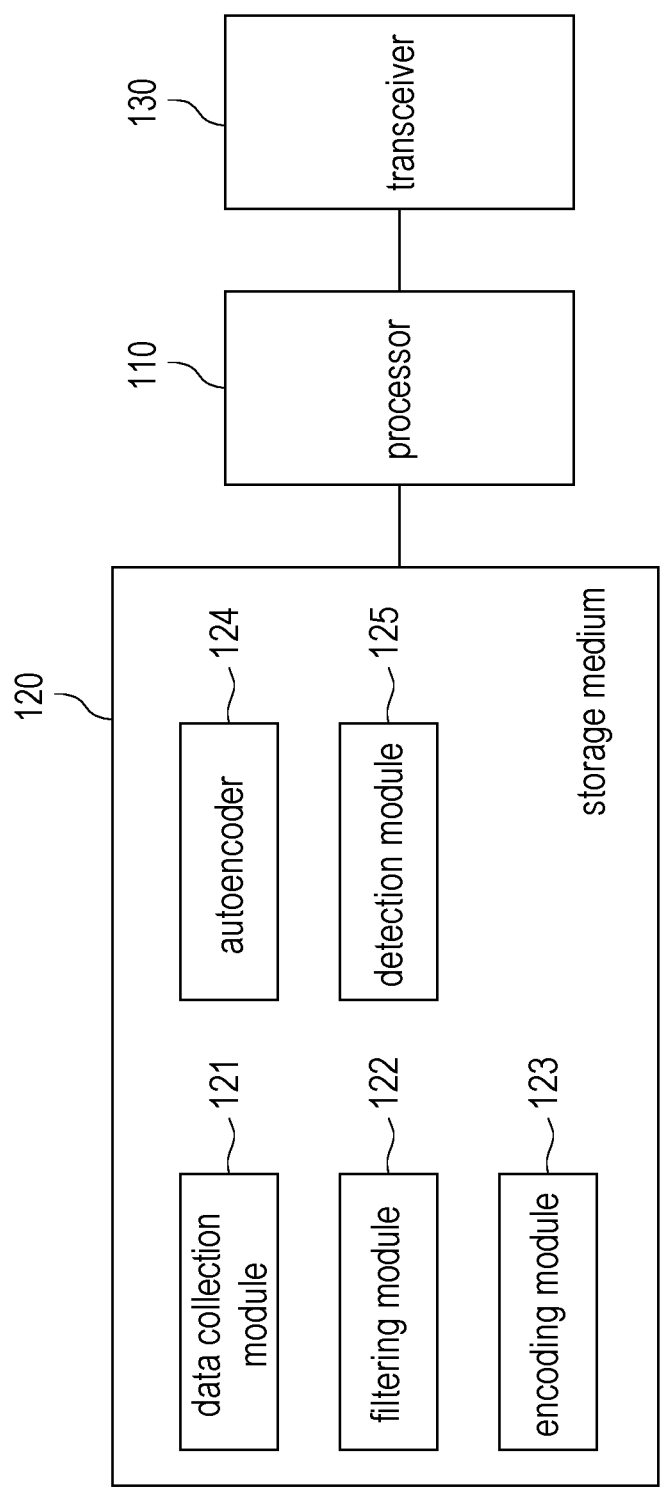
FIG. 1 illustrates a schematic diagram of a detection device for malicious HTTP requests according to an embodiment of the disclosure.

In order to make the content of the disclosure more comprehensible, the following embodiments are specifically cited as examples based on which the disclosure can indeed be implemented. In addition, wherever possible, elements/components/steps with the same reference numbers in the drawings and embodiments represent the same or similar components.

FIG. 1 illustrates a schematic diagram of a detection device 100 for malicious HTTP requests according to an embodiment of the disclosure. The detection device 100 may include a processor 110, a storage medium 120, and a transceiver 130.

The processor 110 is, for example, a central processing unit (CPU), or other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA) or other similar components or a combination of the above components. The processor 110 may be coupled to the storage medium 120 and the transceiver 130, and access and execute multiple modules and various application programs stored in the storage medium 120.

The storage medium 120 is, for example, any type of fixed or removable random access memory (RAM), read-only memory (ROM), flash memory, hard disk drive (HDD), solid state drive (SSD) or similar components or a combination of the above components, and configured to store multiple modules or various application programs that can be executed by the processor 110. In this embodiment, the storage medium 120 can store multiple modules including a data collection module 121, a filtering module 122, an encoding module 123, an autoencoder 124, and a detection module 125, the functions of which will be described later.

The transceiver 130 transmits and receives signals in a wireless or wired manner. The transceiver 130 may also perform operations such as low noise amplification, impedance matching, frequency mixing, frequency up-conversion or frequency down-conversion, filtering, amplifying, and the like.

Figure 2:
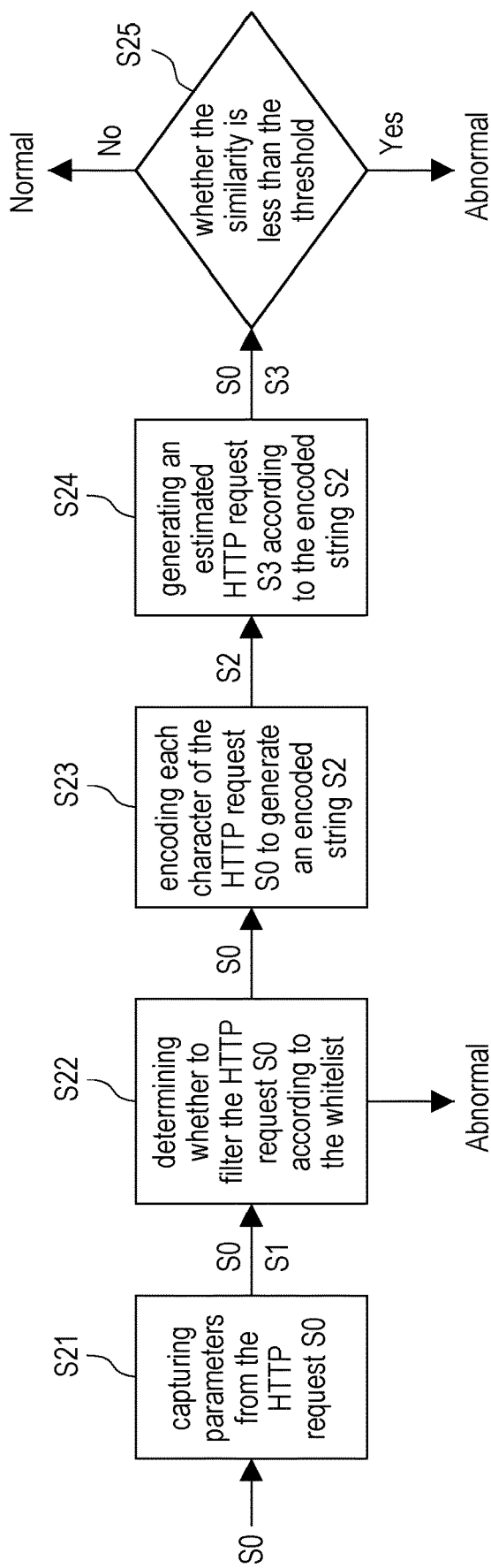
FIG. 2 illustrates a schematic diagram of a detection device detecting a malicious HTTP request according to an embodiment of the disclosure.

FIG. 2 illustrates a schematic diagram of a detection device 100 detecting a malicious HTTP request according to an embodiment of the disclosure. First, the data collection module 121 can receive the HTTP request S0 through the transceiver 130. The HTTP request S0 may be a normal HTTP request or an abnormal HTTP request. Hackers can use structured query language (SQL) injection, buffer overflow, files disclosure, carriage-return line-feed (CRLF) injection, cross-site scripting or parameter tampering to generate malicious HTTP requests. The HTTP request S0 may include a uniform resource locator (URL), and the URL may include parameters. After obtaining the HTTP request S0, in step S21, the data collection module 121 can capture parameters from the HTTP request S0, and the attributes of the captured parameters can include at least one of the following: path segment, request method, or query string. The request method can include "OPTIONS", "GET", "READ", "PUT", "POST", "DELETE", "TRACE" or "CONNECT".

Table 1 is an example of an HTTP request obtained from the CSIC2010 data set. "/tienda1/publico/vaciar.jsp?B2=Vaciar+carrito" is the path segment in the normal HTTP request, and "?B2=Vaciar+carrito" is the parameter in the normal HTTP request. The hacker generates an abnormal HTTP request by injecting malicious SQL ""Vino+Rioja' OR '1'='1'"" into the path segment of a normal HTTP request.

the bit array 300 may be "0" or "1". For example, the bit array 300 may include N bits (N is a positive integer), and the bit #1 of the bit array 300 is equal to "1", the bit #2 is equal to "0", the bit #3 is equal to "0", the bit #4 is equal to "1", the bit #5 is equal to "1", the bit #6 is equal to "0", the bit #7 is equal to "1", the bit #8 is equal to "0", . . . , and the bit #N is equal to "1".

The initial value of each bit in the bit array 300 may be "0". The data collection module 121 can obtain the URL determined to be safe through the transceiver 130. The filtering module 122 can input the URL into a plurality of hash functions to generate hash values corresponding to the plurality of hash functions, and the value range of the plurality of hash functions is between 1 and N. The filtering module 122 can set the bit corresponding to the output of the hash function in the bit array 300 to "1", so as to complete the establishment of the whitelist. For example, after the filtering module 122 inputs a safe URL into a hash function, if the hash value output by the hash function is "5", the filtering module 122 can set the bit #5 in the bit array 300 to "1" to complete the establishment of the whitelist.

The filtering module 122 can input the parameter S1 to multiple hash functions to generate multiple hash values corresponding to the multiple hash functions, respectively. If the multiple hash values of the parameter S1 match the bit array 300, the filtering module 122 can determine that the HTTP request S0 matches the whitelist. If the multiple hash values of the parameter S1 do not match the bit array 300, the filtering module 122 can determine that the HTTP request S0 does not match the whitelist. Accordingly, the filtering module 122 can determine that the HTTP request S0 is an abnormal HTTP request and filter the HTTP request S0. The filtering module 122 can determine that the parameter S1 does not match the bit array 300 in response to that at least one bit corresponding to the multiple hash values of the parameter S1 in the bit array 300 is not "1".

Figure 3:
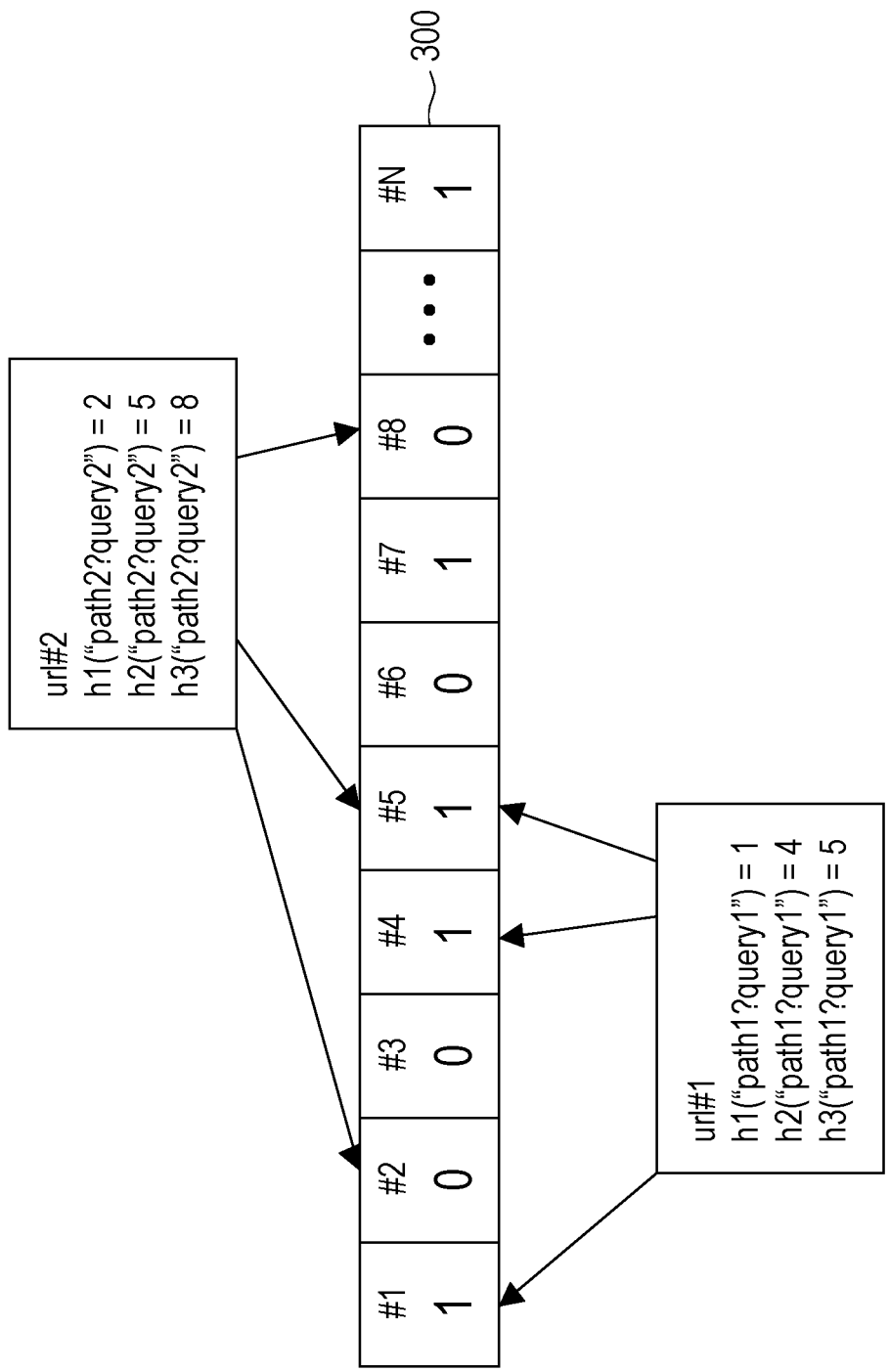
FIG. 3 illustrates a schematic diagram of filtering malicious HTTP requests according to a Bloom filter according to an embodiment of the disclosure.

Take url #1 in FIG. 3 as an example. The filtering module 122 can input the parameter "path1?query1" of url #1 to the hash function h1, the hash function h2, and the hash function h3. Specifically, the hash value output by the hash function h1 is "1", the hash value output by the hash function h2 is "4", and the hash value output by the hash function h3 is "5". The filtering module 122 can determine that the parameter "path1?query1" of url #1 matches the bit array 300 in

TABLE 1

| Normal HTTP request | http://localhost:8080/tienda1/publico/vaciar.jsp?B2=Vaciar+carrito |
| --- | --- |
| Abnormal HTTP request | http://localhost:8080/tienda1/publico/anadir.jsp?cantidad=1&id=3&nombre=Vino%2BRioja%27+OR+%271%27%3D%271&precio=85&B1=A%C3%B1adir+al+carrito |

In step S22, the filtering module 122 can determine whether to filter the HTTP request S0 according to the whitelist. If the parameter S1 of the HTTP request S0 matches the whitelist, the filtering module 122 may not filter the HTTP request S0, and transmits the HTTP request S0 to the encoding module 123. If the parameter S1 of the HTTP request S0 does not match the whitelist, the filtering module 122 can determine that the HTTP request S0 is an abnormal HTTP request, and can filter the HTTP request S0.

In an embodiment, the filtering module 122 can determine whether to filter the HTTP request S0 through a Bloom filter. FIG. 3 illustrates a schematic diagram of filtering malicious HTTP requests according to a Bloom filter according to an embodiment of the disclosure. Specifically, the whitelist of the Bloom filter may include a bit array 300, and each bit in response to that the bit #1 corresponding to the hash value "1", the bit #4 corresponding to the hash value "4", and the bit #5 corresponding to the hash value "5" in the bit array 300 is "1".

Take url #2 in FIG. 3 as an example. The filtering module 122 can input the parameter "path2?query2" of url #2 into the hash function h1, the hash function h2, and the hash function h3. Specifically, the hash value output by the hash function h1 is "2", the hash value output by the hash function h2 is "5", and the hash value output by the hash function h3 is "8". The filtering module 122 can determine that the parameter "path2?query2" of url #2 does not match the bit array 300 in response to that at least one of the bit #2 corresponding to the hash value "2", the bit #5 corresponding to the hash value "5", and the bit #8 corresponding to the hash value "8" in the bit array 300 is not "1".

The filtering module 122 can filter most of the malicious HTTP requests based on the whitelist with very few computing resources. Therefore, only a few malicious HTTP requests will pass the first stage of filtering (i.e., step S22). The detection device can detect these few malicious HTTP requests according to the second stage of filtering (i.e., step S23 to step S25).

In step S23, the encoding module 123 may encode each character in the HTTP request S0 to generate an encoded string S2 in response to the HTTP request S0 not being filtered. The encoding module 123 can encode the characters in the HTTP request S0 according to one-hot coding, FeatureHasher, Helmert coding, or entity embedding, the disclosure is not limited thereto.

In an embodiment, the encoding module 123 can determine whether to zero-fill the encoded string S2 or truncate the encoded string S2 according to the autoencoder 124, so that the length of the encoded string S2 conforms to the input format of the autoencoder 124.

Specifically, the encoding module 123 can generate multiple historical encoded strings respectively corresponding to multiple historical HTTP requests according to multiple historical HTTP requests, and the multiple historical encoded strings may include a specific historical encoded string with a maximum length. The encoded module 123 can fill in zeros for other historical encoded strings other than the specific historical encoded string, so that all historical encoded strings conform to the maximum length. The processor 110 can train the autoencoder 124 according to a plurality of historical encoded strings after performing zero-filling.

The encoding module 123 can determine whether the length of the encoded string S2 is less than the maximum length of the historical encoded string. If the length of the encoded string S2 is less than the maximum length, the encoding module 123 can fill zero for the encoded string S2 so that the length of the encoded string S2 is the same as the maximum length. If the length of the encoded string S2 is greater than the maximum length, the encoding module 123 can truncate the encoded string S2 so that the length of the encoded string S2 is the same as the maximum length.

In step S24, the autoencoder 124 may generate an estimated HTTP request S3 according to the encoded string S2, and the autoencoder 124 may include a seq2seq model based on a long short-term memory (LSTM) neural network, the disclosure is not limited thereto.

In step S25, the detection module 125 can determine whether the similarity between the HTTP request S0 and the estimated HTTP request S3 is less than the similarity threshold to generate a determined result. If the similarity is less than the similarity threshold, the detection module 125 can determine that the HTTP request S0 is a malicious HTTP request. If the similarity is greater than or equal to the similarity threshold, the detection module 125 can determine that the HTTP request S0 is a normal HTTP request. The detection module 125 can output the determined result through the transceiver 130 for the user's reference. The determined result may indicate that the HTTP request S0 is a normal HTTP request or an abnormal HTTP request.

The detection module 125 can calculate the similarity between the HTTP request S0 and the estimated HTTP request S3 based on sequence distance, cosine similarity, longest common subsequence (LCS), or Levenshtein distance, the disclosure is not limited thereto.

In an embodiment, the autoencoder 124 can generate multiple estimated data respectively corresponding to multiple verification data according to the multiple verification data, and the multiple verification data may include multiple normal HTTP requests. The detection module 125 can calculate multiple similarities based on multiple verification data and multiple estimated data, and set one of the multiple similarities as a similarity threshold. In an embodiment, the similarity threshold may be associated with the attribute of the parameter S1. For example, HTTP requests with different query string lengths should use similarity thresholds with different values. In another example, HTTP requests with different request methods should use similarity thresholds with different values. The detection module 125 can set a similarity threshold according to the attributes of the parameters of the HTTP request to reduce the false positive rate (FPR).

In an embodiment, the HTTP request S0 may include a session identity. The detection module 125 may increase a counter value corresponding to the session identity (for example, increase the counter value by one) in response to determining that the HTTP request S0 is a malicious HTTP request. The detection module 125 may reset the count value corresponding to the session identity (for example, set the count value to zero) in response to determining that the HTTP request S0 is a normal HTTP request. The detection module 125 can output a warning message through the transceiver 130 in response to that the count value of the session identity being greater than a tolerance value, and the warning message can indicate that the session identity denotes a malicious hacker.

Figure 4:
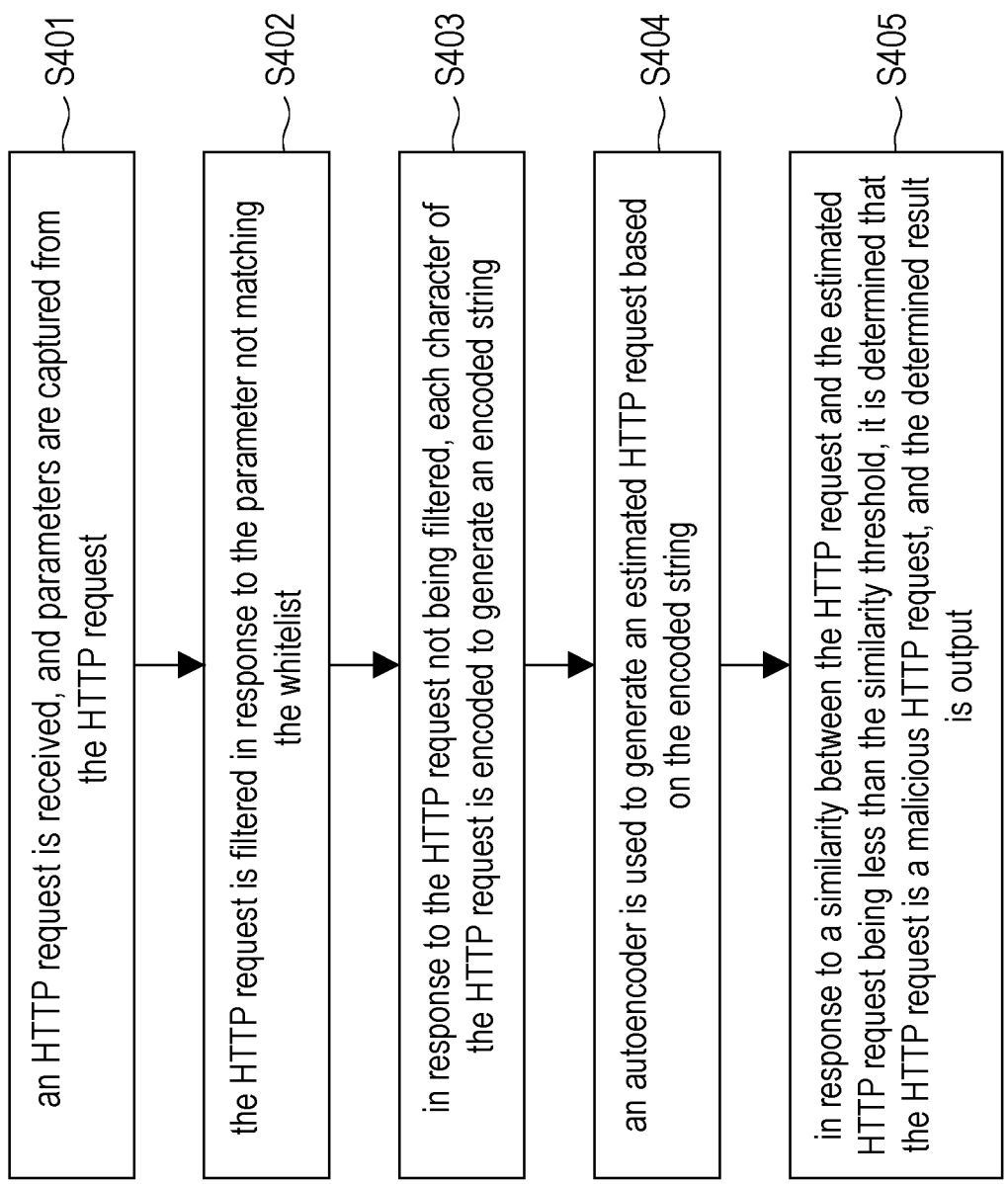
FIG. 4 illustrates a flowchart of a method for detecting malicious HTTP requests according to an embodiment of the disclosure.

FIG. 4 illustrates a flowchart of a method for detecting malicious HTTP requests according to an embodiment of the disclosure, and the detection method can be implemented by the detection device 100 shown in FIG. 1. In step S401, an HTTP request is received, and parameters are captured from the HTTP request. In step S402, the HTTP request is filtered in response to the parameter not matching the whitelist. In step S403, in response to the HTTP request not being filtered, each character of the HTTP request is encoded to generate an encoded string. In step S404, an autoencoder is used to generate an estimated HTTP request based on the encoded string. In step S405, in response to a similarity between the HTTP request and the estimated HTTP request being less than the similarity threshold, it is determined that the HTTP request is a malicious HTTP request, and the determined result is output.

In summary, the detection device of the disclosure detects malicious HTTP requests through a two-stage filtering method. First, the detection device can quickly filter the known malicious HTTP requests by using the whitelist. After the first stage of filtering, the detection device can input the remaining HTTP requests to the autoencoder to generate estimated HTTP requests. The detection device can determine whether the input data is a malicious HTTP request based on the similarity between the input data and the output data of the autoencoder. The detection device of the disclosure can improve the accuracy of detecting malicious HTTP requests while consuming less computing resources and less time.

What is claimed is:

1. A detection device for a malicious HTTP (hypertext transfer protocol) request, comprising:
a transceiver;
a storage medium, storing a plurality of modules; and a processor, coupled to the storage medium and the transceiver, and accessing and executing the plurality of modules, wherein the plurality of modules comprise:
- a data collection module, receiving a HTTP request through the transceiver, and capturing parameters from the HTTP request;
- a filtering module, filtering the HTTP request in response to the parameters not matching a whitelist;
- an encoding module, encoding each character of the HTTP request to generate an encoded string in response to the HTTP request not being filtered;
- an autoencoder, generating an estimated HTTP request based on the encoded string; and
- a detection module, determining that the HTTP request is the malicious HTTP request in response to a similarity between the HTTP request and the estimated HTTP request is less than a similarity threshold, and outputting a determined result through the transceiver, wherein the autoencoder generates a plurality of estimated data according to a plurality of verification data, wherein the detection module calculates a plurality of similarities based on the plurality of verification data and the plurality of estimated data, and sets one of the plurality of similarities as the similarity threshold.

2. The detection device according to claim 1, wherein the plurality of verification data comprise a plurality of normal HTTP requests.

3. The detection device according to claim 1, wherein the similarity threshold is associated with attributes of the parameters.

4. The detection device according to claim 3, wherein the HTTP request comprises a uniform resource locator (URL), and the attributes comprise at least one of the following: path segment, request method, or query string.

5. The detection device according to claim 1, wherein the HTTP request comprises a session identity, and the detection module increases a count value corresponding to the session identity in response to determining that the HTTP request is the malicious HTTP request, and resets the count value in response to determining that the HTTP request is not the malicious HTTP request.

6. The detection device according to claim 5, wherein the detection module outputs a warning message through the transceiver in response to the count value being greater than a tolerance value.

7. The detection device according to claim 1, wherein the whitelist comprises a bit array, and the filtering module inputs the parameters to a plurality of hash functions to generate a plurality of hash values, and filters the HTTP request in response to the plurality of hash values not matching the bit array.

8. The detection device according to claim 1, wherein the encoding module encodes the character of the HTTP request according to one of the following: one-hot coding, Feature-Hasher, Helmert coding, and entity embedding.

9. The detection device according to claim 1, wherein the encoding module encodes a plurality of historical HTTP requests to generate a plurality of historical encoded strings, and the processor trains the autoencoder according to the plurality of historical encoded strings.

10. The detection device according to claim 9, wherein the plurality of historical encoded strings comprise a historical encoded string having a maximum length, and the encoding module performs zero-filling on the encoded string in response to a length of the encoded string being less than the maximum length, so that the length is the same as the maximum length.

11. The detection device according to claim 9, wherein the plurality of historical encoded strings comprise a historical encoded string having a maximum length, and the encoding module truncates the encoded string in response to a length of the encoded string being greater than the maximum length, so that the length is the same as the maximum length.

12. The detection device according to claim 1, wherein the autoencoder comprises a seq2seq model based on a long short-term memory (LSTM) neural network.

13. The detection device according to claim 1, wherein the similarity comprises one of the following: a sequence distance, a cosine similarity, a longest common subsequence (LCS), or a Levenshtein distance.

14. A detection method for a malicious HTTP request, comprising:
- receiving an HTTP request, and capturing parameters from the HTTP request;
- filtering the HTTP request in response to the parameters not matching a whitelist;
- encoding each character of the HTTP request to generate an encoded string in response to the HTTP request not being filtered;
- generating an estimated HTTP request according to the encoded string by using an autoencoder;
- determining that the HTTP request is the malicious HTTP request in response to a similarity between the HTTP request and the estimated HTTP request being less than a similarity threshold, and outputting a determined result;
- generating a plurality of estimated data according to a plurality of verification data by the autoencoder;
- calculating a plurality of similarities based on the plurality of verification data and the plurality of estimated data; and
- setting one of the plurality of similarities as the similarity threshold.

* * * * *